No. 803,053. PATENTED OCT. 31, 1905.
H. G. FISKE.
TIRE.
APPLICATION FILED JUNE 17, 1899.
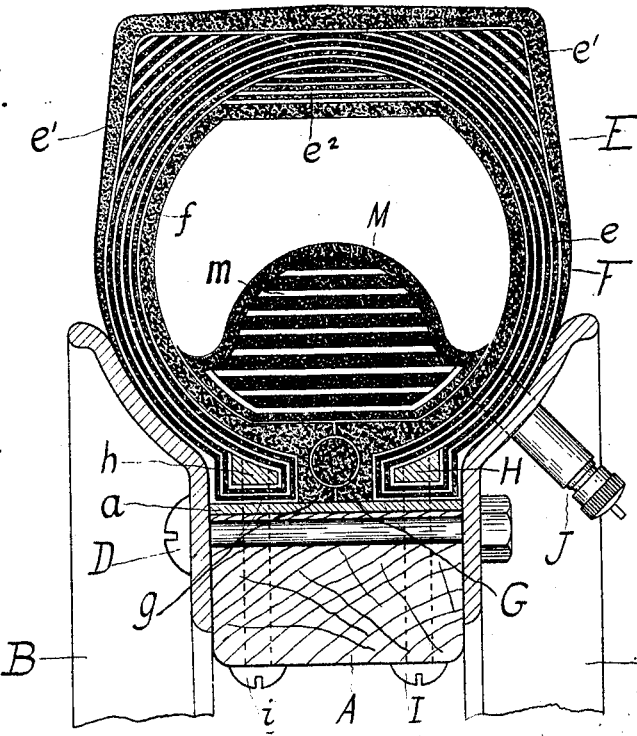
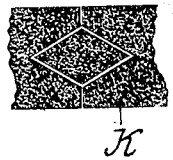
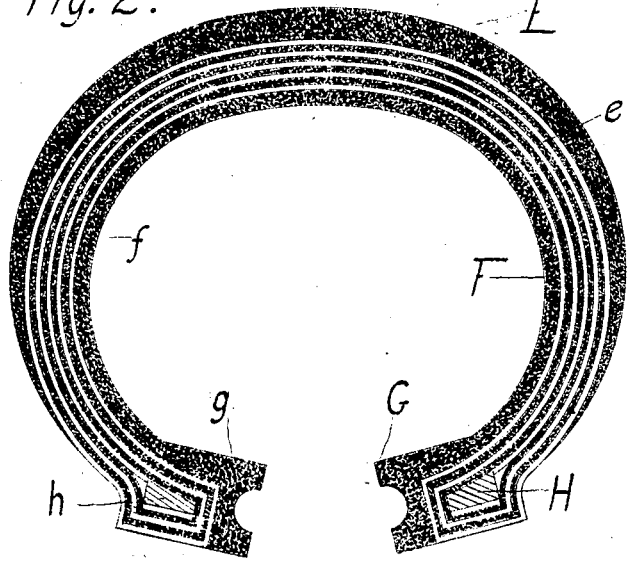
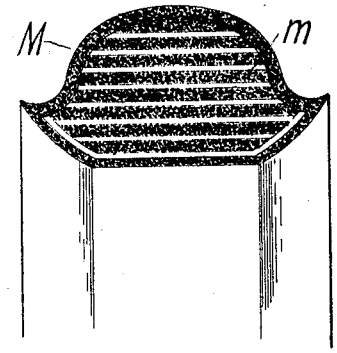
Witnesses.
Rudolph Rieg.
H. P. Martin
Inventor.
Henry G. Fiske
by Hermann Hand
his atty.

UNITED STATES PATENT OFFICE.

HENRY G. FISKE, OF NEW YORK, N. Y., ASSIGNOR, BY MESNE ASSIGNMENTS, TO MORTON TRUST COMPANY, TRUSTEE, A CORPORATION OF NEW YORK.

TIRE.

No. 803,053.  Specification of Letters Patent.  Patented Oct. 31, 1905.

Application filed June 17, 1899. Serial No. 720,915.

*To all whom it may concern:*

Be it known that I, HENRY G. FISKE, a citizen of the United States of America, and a resident of the city of New York, county of New York, and State of New York, have invented certain new and useful Improvements in Tires, of which the following is a specification.

My invention relates to improvements in pneumatic tires; and it is embodied in a tire of the single-tube variety where the tire is mechanically attached to the rim so as to be readily detachable and removable therefrom and which also comprises a mechanical seal—that is to say, that said tire is f rmed in a single piece, which is mechanically sealed, so as to constitute an air-tight tube, and which can be readily opened to permit of access to its interior, thereby rendering possible the most extensive repairs. Furthermore, my improved tire is provided with a riding-cushion applied upon its interior, so as to distend and support the tire beyond the edges of the rim in case of puncture while normally resting upon and protecting the mechanical seal by which the air is kept in the tire, all as will be hereinafter more particularly pointed out, and referred to in the appended claims, in connection with the accompanying drawings, in which—

Figure 1 is a transverse sectional elevation showing my improved tire in position in the rim of a wheel. Fig. 2 is a detail view of the tire apart from the rim and unsealed. Fig. 3 is an end view of the riding-cushion. Fig. 4 is a detailed view of the sealing-strip. Fig. 5 is a view of the meeting edges of the tire, showing a sealing-strip of slightly different form in position between said edges.

In the drawings, Fig. 1, A is the felly of a wheel, which is preferably of wood, and provided upon its periphery with a metallic band $a$, which increases its strength and stability. At each side of the felly A are secured metallic flanges B C, which have parallel inner edges secured to the felly A by bolts D, passing through the flanges and the felly. The outer portions of the flanges B C flare outwardly to form a trough-shaped receptacle for the tire E. These flanges B C are preferably so formed that they project slightly above the edge of the felly and are arranged with two parallel faces which lie against and compress the opposite sides of the tire at a point near its seat on the felly and hold the tire against lateral displacement. This arrangement prevents the meeting edges of the tire becoming displaced to such an extent as to permit opening of the seam between the abutting edges. The flanges flare outwardly from this slightly-raised portion and with the felly form a support for the tire.

The tire E is composed of a casing $e$, which is separated on its lower central line so as to be capable of being opened by the parting of its edges, as indicated in Fig. 2. When this casing $e$ is removed from the rim and its edges separated, such complete access is afforded to its interior that most extensive repairs can be readily made.

The casing $e$ comprises several layers of combined fabric and rubber F, which are arranged in approximately circular form, but are separated at their lower edges by extended portions G $g$ of the inner air-tight lining $f$ of the casing $e$. The separated edges of the reinforcing fabric F are arranged about two metallic strips H $h$, which are of size sufficient to permit them to slip over the periphery of the felly A, and at suitable points these metallic strips H $h$ are formed with screw-threaded openings to receive the locking-bolts I $i$, which are passed through the openings in the felly A and into engagement with the said strips H $h$, thereby securely attaching the tire in position.

While the tire E may be of the usual circular form, as indicated in Fig. 2, I prefer to construct it as indicated in Fig. 1, in which a flat tread is produced by fillings $e'$, of combined fabric and elastic material, to form the flattened tread portion, and in order to add to the strength and give increased protection against puncture I add a filling $e^2$, of fabric and rubber, across the inside of the outer or tread portion of the tire, and with this construction the inner air-tight lining $f$ is carried inside of the said filling $e^2$, so that no air would escape from the tire until said filling had been penetrated and the inner tube or lining $f$ punctured.

J indicates an air-inlet by which the tire is filled in the usual manner.

The projecting edges G $g$ of the soft inner lining of the tire extend sufficiently so that when the two strips H $h$ have been forced into position upon the periphery of the felly A and locking-bolts I *i* have been screwed into position that the said meeting edges will be squeezed closely together. A sealing-strip *j* is placed in the grooves which are formed in each of the edges G *g*, and this strip *j* is preferably coated with cement, so that when the edges are brought together upon the said sealed strip an absolutely air-tight joint will be formed. This joint, however, can at any time open by pulling the edges G *g* apart, or by splitting the sealing-strip and subsequently removing the pieces from each groove by the application of a solvent to the cement by which said portions of the strip are held in place. The exact shape of the strip is not material, but may preferably be as indicated in Fig. 5.

M indicates what I have called a "riding-cushion." This is a band or belt of elastic material which is also strengthened by fabric *m*, contained in its interior in order that the material shall not be crushed by the application of the load. This riding strip or cushion is arched toward its center and its under side corresponds to the shape of the inside of the part of the tire E, which is next to the rim. The riding-cushion M is preferably made in endless form and is placed upon the rim and within the tire before the latter is finally secured in position.

The operation of assembling the tire is as follows: One or both of the flanges B C having been removed from the felly A the edge of one side of the tire E is fitted upon the felly with the holes in the locking-strip in position to engage the locking-bolts. The riding-cushion M may be placed in position before the sealing-strip is applied, and the other edge of the tire is then slipped on. When this has been accomplished, it is usual to apply the side flanges B C and to draw them into final position by means of their bolts D. The result of this will be to force the sealing edges G *g* into the desired relation with each other and with the sealing-strip and at the same time to bring the locking edges of the tire into position to be engaged by the locking-bolts I *i*, and when these are applied the attachment of the tire to the rim is completed.

One edge of the riding-cushion laps over the opening through which the air is pumped into the tire; but this will not prevent the entrance of compressed air from the pump and can do no harm; on the contrary, will act to assist the valve and valve-cap in preventing escape of air through this part of the apparatus. The riding-cushion may be made longitudinally flexible and may be normally of less diameter than the interior of the tire, so as to be stretched into position, and when this is the case it will by pressing upon the joints in the edges of the tire materially assist in retaining the air.

There are special advantages in providing an independent and removable riding-cushion, as it is obvious that there will be a difference in the diameter between the inner surface of the tread portion and the outer surface of the riding-cushion, and should both these parts be integral with the tire and fixed with relation to each other it is obvious that upon deflation of the tire the outer portion, being of greater diameter, would creep and grind, tending to tear the tire along its sides.

It will be apparent in view of the foregoing that my improved tire may be varied in numerous minor details without departing from the invention, and I therefore do not limit myself to the exact construction shown and described.

Having described my invention, what I claim is—

1. In combination with a supporting-felly, a pneumatic tire comprising a reinforced casing having an air-tight lining, the two parted circumferentially, inexpansible strips inclosed in fabric extending throughout the casing arranged at either side of the part presenting a relatively broad seat portion opposed to the flat felly periphery, means for mechanically holding the edges of the casing to form an air-tight inner cavity, lateral flanges in continuous engagement with the sides, and extending beyond the felly and holding the edges of the casing with the inextensible strips against lateral displacement, whereby the combination of the relatively broad base-strips and the lateral flanges securely holds the seat of the tire against twisting or lateral movement.

2. In combination with a felly and lateral detachable side flanges, of a reinforced casing having an air-tight lining and separated on its under side, an endless metallic band embedded in each edge, a groove in the elastic portion of each edge, a sealing-strip adapted to be fitted into the grooves to make an air-tight joint and bolts passing through the felly into engagement with the metallic bands in the edges of the tire for securing the same in place.

3. A casing having extended edges, an integral elastic inner coating extending upward from the edges and provided with a groove in each face of the elastic coating, a rim having laterally movable side flanges arranged to secure the edges of the casing against lateral movement and to force them together, a filling of elastic material coöperating with and adapted to fill the grooves in the edges of the inner coating and to close the abutting edges against the escape of air, and means for holding the two edges in engagement with the felly.

4. In combination in a pneumatic tire, a casing made up of fabric and rubber having an inner coating of elastic material, the whole circumferentially parted along its seat portion, enlarged edge portions at the part thereof having a relatively broad level seat, means for mechanically sealing the two edges, non-extensible strips of material integral with the adjacent edges substantially band-shaped, their flat portion parallel to the base of the casing edges, a removable riding-cushion within the tire and fitting closely over its meeting edges, detachable flanges on the felly holding the several parts laterally in position thereon, substantially as shown and described.

5. In combination in a tire for vehicles, a tubular casing made up of layers of fabric and rubber and parted circumferentially along its seat portion, inextensible flat strips of material lying parallel to the rim embedded in the edges near the parting, a felly and a circumferential rim forming a substantially flat seat for said tire edges, said edges formed with flat base portions and so coacting with the felly periphery as to permit their mounting by sliding on from either side, flanges secured to the sides of said felly, means coacting with said flanges to laterally draw them into place and compress the base edges of the tire whereby their coöperation with the inextensible bands causes their compression upon the felly, said flanges preventing lateral displacement of the edges of said casing, and supporting its sides near their base.

6. The combination in a pneumatic tire, a casing comprising rubber and a plurality of plies of fabric the whole parted circumferentially near its seat portion, circumferentially-inextensible strips of material embedded in the edges, the fabric in said casing extending from the walls around said inextensible strips and again into the walls of said tire, means within said casing overlapping the parting coacting to effect the air-tight interior of said tire, laterally-detachable flanges coacting with the felly, said casing seated upon the periphery of the felly and said flanges extending beyond the edge thereof continuously around the felly preventing the lateral displacement of the casing and further extending radially and laterally to support the base portion of said casing and prevent displacement of the portion with the inextensible strips.

7. The combination in a pneumatic tire of a casing parted circumferentially at its base, the edges at the base embodying a plurality of layers of fabric and built up to form substantially, flat inextensible beads or base parts presenting a broad seat, substantially flat metallic members coöperating with said tire edges to prevent radial displacement thereof, said edges forming a base for said tire of lesser width than the diameter of the tire, a flat felly of a width substantially equal to the final width of the tire-base when in position, lateral flanges secured to the side of said felly and means coöperating therewith to laterally compress said tire-base and secure the same to the felly.

8. The combination in a pneumatic tire, of a casing parted circumferentially at its base, the resultant edges so formed as to present together a flat base narrow in comparison with the diameter of the tire and of a thickness substantially the same as the lateral walls of said tire-casing, a felly and a circumferential rim having a substantially flat seat for said tire edges, a metallic ring on the outside of each of said tire edges and means coöperating with said rings, felly and tire edges to hold the latter against lateral displacement and force the same in compressed contact with the felly.

9. The combination in a pneumatic tire, of a casing parted circumferentially at its base, the resultant edges so formed as to present together a flat base narrow in comparison with the diameter of the tire, a felly and a circumferential rim having a substantially flat seat for said tire edges, metallic rings of greater diameter than said rim and means coöperating with said rings, said felly and said tire edges to prevent circumferential movement of the tire upon the rim, bolts projecting through the rim radially outward and engaging the circumferential metallic bands.

10. In combination in a tire for vehicles, a tubular casing made up of layers of fabric and rubber and having a substantially flat tread, the whole being circumferentially parted along its seat portion, inexpansible metallic strips arranged within the fabric and adjacent to the meeting edges, means for mechanically uniting the edges of the tire while it is in place on its felly, a riding-cushion closely conforming to the interior of the seat portion of the tire, means for holding the tire against lateral displacement and means coöperating with the non-metallic strips adapted to hold the abutting edges of the tire in fixed relation to each other.

11. In combination in a tire, a tubular portion comprising a series of layers of fabric and rubber parted circumferentially, an inner coating of elastic material extending beyond the parting edges of the tubular portion and integral with it, inexpansible strips of material formed within and adjacent to the edges, a filling-piece and interengaging parts located along the meeting edges of the tire and adapted to coöperate to form an air-tight joint, means coöperating with the inexpansible strips for holding them and the tire as a whole positively to the felly, a felly and laterally-extending flanges applied to opposite sides of the felly and provided with parallel portions adapted to hold the tire against lateral displacement.

Signed by me at New York, N. Y., this 16th day of June, 1899.

HENRY G. FISKE.

Witnesses:
 FRANKLAND JANNUS,
 JOUEL S. DE SELDING.